(12) United States Patent
Bang et al.

(10) Patent No.: US 8,237,592 B2
(45) Date of Patent: Aug. 7, 2012

(54) SYSTEM AND METHOD FOR PROVIDING POLICY BASED RADIO FREQUENCY IDENTIFICATION SERVICE

(75) Inventors: Hyochan Bang, Daejeon (KR); Jae Gak Hwang, Daejeon (KR); Cheol Sig Pyo, Daejeon (KR); Hyung Jin Ahn, Seoul (KR); Kwang Hoon Kim, Yongin-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 387 days.

(21) Appl. No.: 12/508,502

(22) Filed: Jul. 23, 2009

(65) Prior Publication Data

US 2010/0097242 A1  Apr. 22, 2010

(30) Foreign Application Priority Data

Oct. 22, 2008  (KR) .................. 10-2008-0103803

(51) Int. Cl.
 *H04B 14/00* (2006.01)
(52) U.S. Cl. ........ 340/999; 340/506; 340/517; 340/521; 340/3.1
(58) Field of Classification Search .............. 340/99, 340/506, 517, 521, 3.1
See application file for complete search history.

(56) References Cited

U.S. PATENT DOCUMENTS

| | | | | |
|---|---|---|---|---|
| 5,400,246 A | * | 3/1995 | Wilson et al. .................. | 700/17 |
| 7,295,116 B2 | | 11/2007 | Kumar et al. | |
| 2006/0047789 A1 | | 3/2006 | Kumar et al. | |
| 2006/0225124 A1 | * | 10/2006 | Kolawa et al. .................. | 726/1 |
| 2008/0235755 A1 | * | 9/2008 | Blaisdell et al. ................ | 726/1 |
| 2011/0321122 A1 | * | 12/2011 | Mwangi et al. ................. | 726/1 |

FOREIGN PATENT DOCUMENTS

| | | |
|---|---|---|
| KR | 10-2006-0092829 A | 8/2006 |
| KR | 10-2006-0092862 A | 8/2006 |
| KR | 10-0723869 B1 | 5/2007 |
| KR | 10-2008-0060893 A | 7/2008 |
| KR | 10-2008-0069409 A | 7/2008 |

OTHER PUBLICATIONS

Jing Xu, et al., "XML Based RFID Event Management Framework", The Proceedings of TENCON 2006, IEEE, Nov. 2006.
Mikyeong Moon, et al., "Contextual Events Framework in RFID System", The Proceedings of ITNG 2006, IEEE Computer Society, Oct. 2006.
Fusheng Wang, et al., "Bridging Physical and Virtual Worlds: Complex Event Processing for RFID Data Streams", Lecture Notes in Computer Science, Springer Berlin/ Heidelberg, Oct. 2006, pp. 588-607.

* cited by examiner

*Primary Examiner* — Daryl Pope
(74) *Attorney, Agent, or Firm* — Kile Park Goekjian Reed & McManus PLLC (57) ABSTRACT

Disclosed is a system and method for providing a policy based radio frequency identification service. The system for providing the policy based radio frequency identification service includes a policy vocabulary managing device for generating and managing policy vocabulary based on a policy vocabulary writer's control input, a policy performing resource managing device for generating and managing resource information for performing a radio frequency identification service policy based on a resource designator's control input, a policy rule managing device for generating and managing a policy rule sentence based on a policy user's control input, and a policy rule performing device for performing a radio frequency identification service policy by using a policy rule sentence input based on a policy user's control input.

19 Claims, 11 Drawing Sheets

SYSTEM AND METHOD FOR PROVIDING POLICY BASED RADIO FREQUENCY IDENTIFICATION SERVICE

CROSS-REFERENCE TO RELATED APPLICATION

This application claims priority to and the benefit of Korean Patent Application No. 10-2008-0103803 filed in the Korean Intellectual Property Office on Oct. 22, 2008, the entire contents of which are incorporated herein by reference.

BACKGROUND OF THE INVENTION (a) Field of the Invention

The present invention relates to a system and method for providing a policy based radio frequency identification service.

(b) Description of the Related Art

Conventional radio frequency identification (RFID) service providing methods follow the subsequent processes. A user who has the right to control and manage RFID application events specifies an application-level event refining rule so as to refine a large amount of raw data transmitted from an RFID network. An RFID service manager disposes a defined application event rule specification on managed RFID middleware systems. The RFID middleware systems filter, group, and refine a large volume of raw data transmitted by RF readers that are connected according to the rule of the disposed application event standard specification, and transmit tag data that are refined according to the event standard specification to a random application that is a trigger destination. The application having received an RFID event result report analyzes the report and uses the tag data for the business logic.

However, since the conventional RFID application event refining rule specification method is structured to be easily analyzed and processed by the RFID middleware system, it is difficult for a manager lacking technical understanding to use the prior art. Regarding the existing RFID service realization method, developers must learn various skills regarding business domains as well as the skills for the RFID network domains, and must be responsible for many parts during the service realization process in order to apply the refined tag data acquired from the RFID middleware system to the business logic. Further, since the conventional cooperation methods with the tag data refining rule specification and business logic for providing the RFID service causes waste of time and cost required for understanding detailed skills, they may worsen service provision productivity, efficiency, and flexibility.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system and method having advantages of efficiently describing a policy for the RFID service and flexibly applying the described policy to the RFID service providing system.

An exemplary embodiment of the present invention provides a system for providing a policy-based radio frequency identification service, including: a policy rule converter for converting a user level policy rule sentence that is generated by using generated policy vocabulary into an executable format, and converting an event declaration within the policy rule sentence into a format that is executable by a middleware system based on generated policy performing resource information; and a policy rule performer for distributing the converted event declaration to the middleware system, determining whether refined event data that are refined and transmitted by the middleware system based on the converted event declaration satisfy a policy condition of the policy rule sentence, and determining whether to drive an application system for performing a policy action of the policy rule sentence.

Another embodiment of the present invention provides a system for providing a policy based radio frequency identification service, including: a policy vocabulary managing device for generating and managing policy vocabulary for generating a policy rule corresponding to the radio frequency identification service; a policy performing resource managing device for generating and managing resource information for performing the policy rule; a policy rule managing device for generating and managing a policy rule sentence corresponding to the policy rule by using the policy vocabulary; and a policy rule performing device for distributing an event declaration included in the policy rule to a middleware system, determining whether the refined event data that is refined and transmitted by the middleware system based on the event declaration satisfy a policy condition included in the policy rule, and determining whether to drive an application system.

Yet another embodiment of the present invention provides a method for providing a policy based radio frequency identification service, including: converting a user level policy rule sentence that is generated by using generated policy vocabulary into an executable format; converting an event declaration within the policy rule sentence into a format executable by a middleware system; distributing the converted event declaration to the middleware system; determining whether the refined event data that are refined and transmitted by the middleware system based on the event declaration satisfy a policy condition corresponding to the policy rule sentence; and calling and driving an application system for performing a policy action when the refined event data satisfy the policy condition.

Yet another embodiment of the present invention provides a method for providing a policy based radio frequency identification service, including: generating policy vocabulary for writing a policy rule corresponding to the radio frequency identification service as a policy rule sentence; generating resource information for performing the policy rule; generating the policy rule sentence by using the policy vocabulary; converting an event declaration included in the policy rule sentence into a format executable by a middleware system, and distributing the format to the middleware system; and driving an application system for performing a unit action or business logic corresponding to policy performance of the policy rule sentence when refined event data that are refined and transmitted by the middleware system based on the event declaration satisfy a policy condition of the policy rule sentence.

According to the present invention, the policy for the RFID service can be efficiently described, and the described policy can be flexibly applied to the RFID service providing system.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

A system and method for providing a policy-based RFID service according to an exemplary embodiment of the present invention will be described in detail with reference to accompanying drawings.

A writer writing RFID service policy vocabulary will be referred to as a policy vocabulary writer, a user using RFID service policy will be called a policy user, and a resource for performing the RFID service policy will be referred to as a resource designator.

Figure 1:
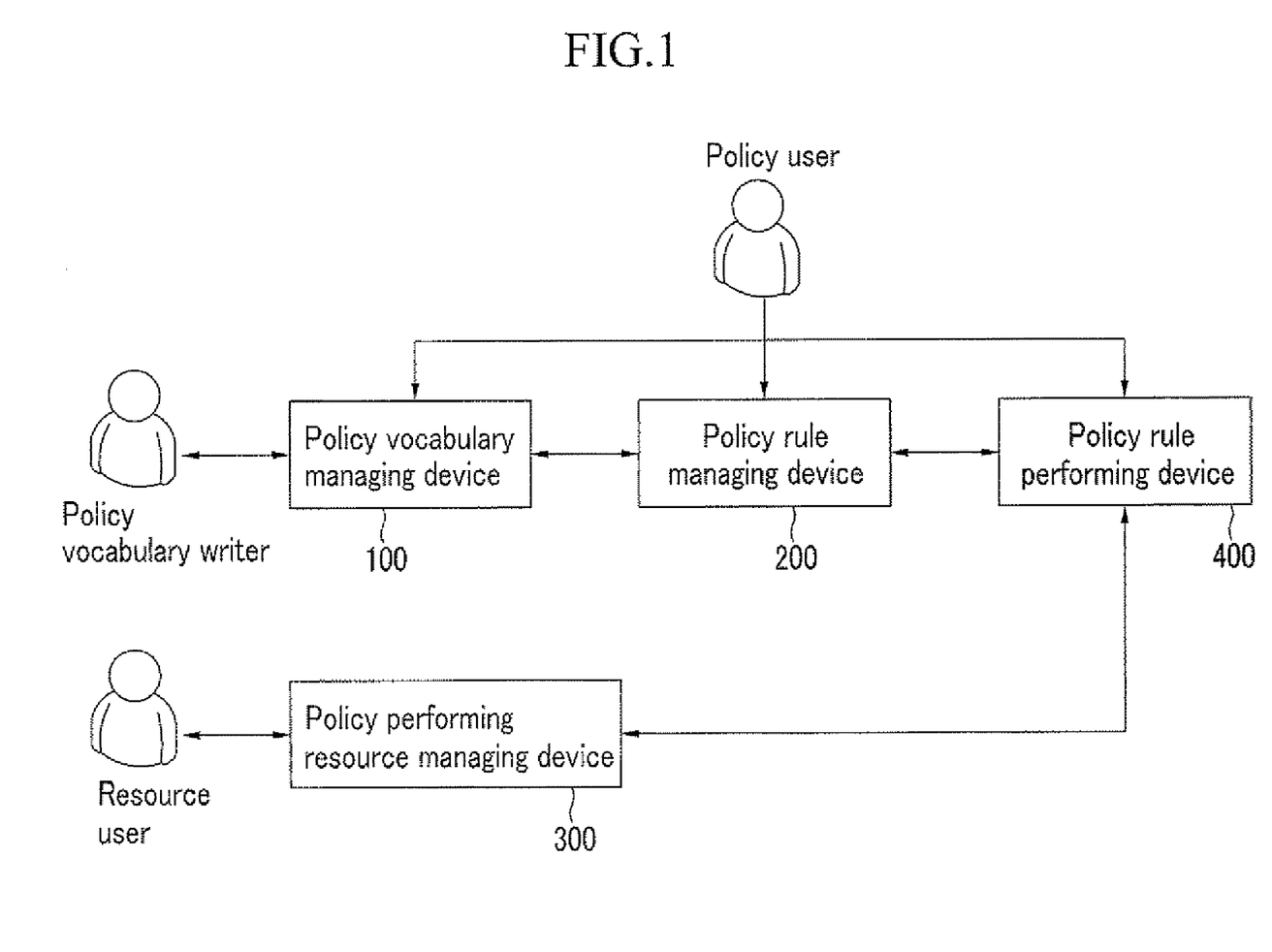
FIG. 1 shows a schematic diagram of a system for providing a policy based RFID service according to an exemplary embodiment of the present invention.

FIG. 1 shows a schematic diagram of a system for providing a policy based RFID service according to an exemplary embodiment of the present invention.

Referring to FIG. 1, the system includes a policy vocabulary managing device 100, a policy rule managing device 200, a policy performing resource managing device 300, and a policy rule performing device 400.

The policy vocabulary managing device 100 generates policy vocabulary required for generating the policy rule for the RFID service and manages the same based on the policy vocabulary writer's control input.

The policy rule managing device 200 generates and manages a policy rule sentence for the RFID service by using the policy vocabulary generated by the policy vocabulary managing device 100 based on the policy user's control, and transmits the generated policy rule sentence to the policy rule performing device 400 so that the policy rule performing device 400 may perform the corresponding policy rule.

The policy performing resource managing device 300 generates and manages information on the resource for the policy rule performing device 400 to perform the policy rule for the RFID service based on the resource designator's control input.

The policy rule performing device 400 performs the policy rule sentence input by the policy rule managing device 200 based on the policy user's control input.

Figure 2:
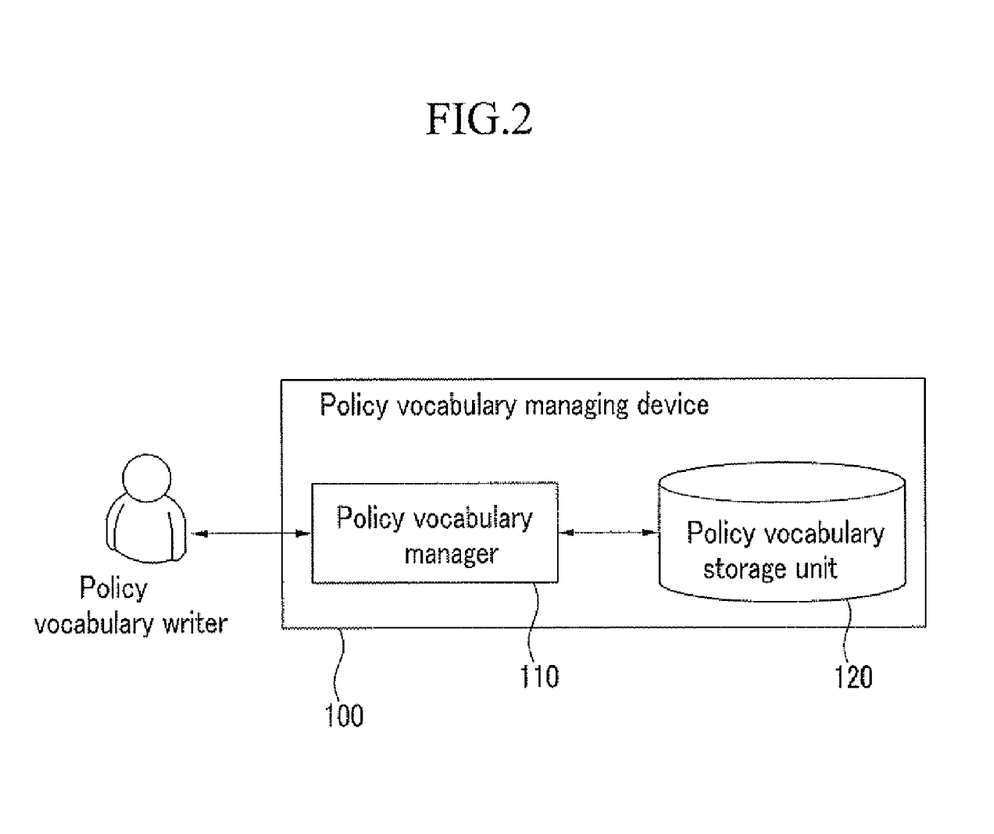
FIG. 2 shows a configuration diagram of a policy vocabulary managing device according to an exemplary embodiment of the present invention.

FIG. 2 shows a configuration diagram of a policy vocabulary managing device 100 according to an exemplary embodiment of the present invention.

Referring to FIG. 2, the policy vocabulary managing device 100 includes a policy vocabulary manager 110 and a policy vocabulary storage 120.

The policy vocabulary manager 110 generates policy vocabulary for generating a policy rule for the RFID service based on the policy vocabulary writer's control input. It stores the generated policy vocabulary in the policy vocabulary storage 120 and manages the same. That is, it provides the policy vocabulary stored in the policy vocabulary storage 120 to the policy vocabulary writer, and modifies or deletes the same. For this, policy vocabulary manager 110 includes a graphic user interface (GUI) or text-based user interface function for interface with the policy vocabulary writer.

Figure 3:
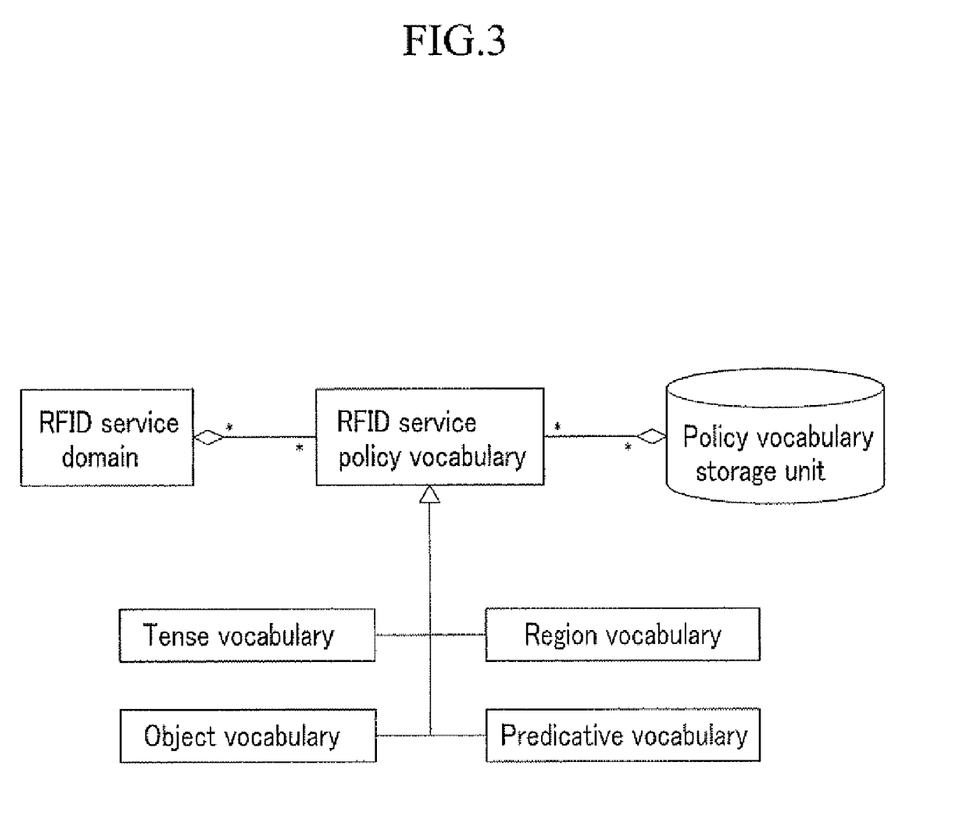
FIG. 3 shows a configuration of policy vocabulary for an RFID service policy according to an exemplary embodiment of the present invention.

FIG. 3 shows a configuration of policy vocabulary for an RFID service policy according to an exemplary embodiment of the present invention, which is shown by using the unified modeling language (UML).

Referring to FIG. 3, a piece of policy vocabulary can belong to at least one RFID service domain. That is, the policy vocabulary managing device 100 can include the generated policy vocabulary in at least one RFID service domain based on the policy vocabulary writer's control input. Here, the RFID service domain represents a logic category to which the policy vocabulary can belong, such as company, type of business, post of duty, role, and product.

The policy vocabulary is classified as tense vocabulary, region vocabulary, object vocabulary, and predicative vocabulary. Here, the respective vocabulary types include attributes understood in common by vocabulary providing vendors and users and extended attributes, and the policy vocabulary can be expressed as an upper-level language that is easy to refer to and use by the policy user by using the attributes of the respective vocabulary types.

The tense vocabulary includes attributes including a valid time available for the policy rule, and an event period for refining a large volume of event data transmitted by the RFID network during the corresponding valid time.

The region vocabulary includes a valid sense region corresponding to the valid region value for sensing the event data generated by the RFID network as an attribute.

The object vocabulary includes objects including RF tags attached to products, things, equipment, and system to which the policy rule will be applied as attributes.

The predicative vocabulary includes a unit action or business logic that is driven when the logic condition for determining whether the refined event data is suitable for policy performance is satisfied, as the attribute. Here, the business logic represents a plurality of actions in a sequence.

Figure 4:
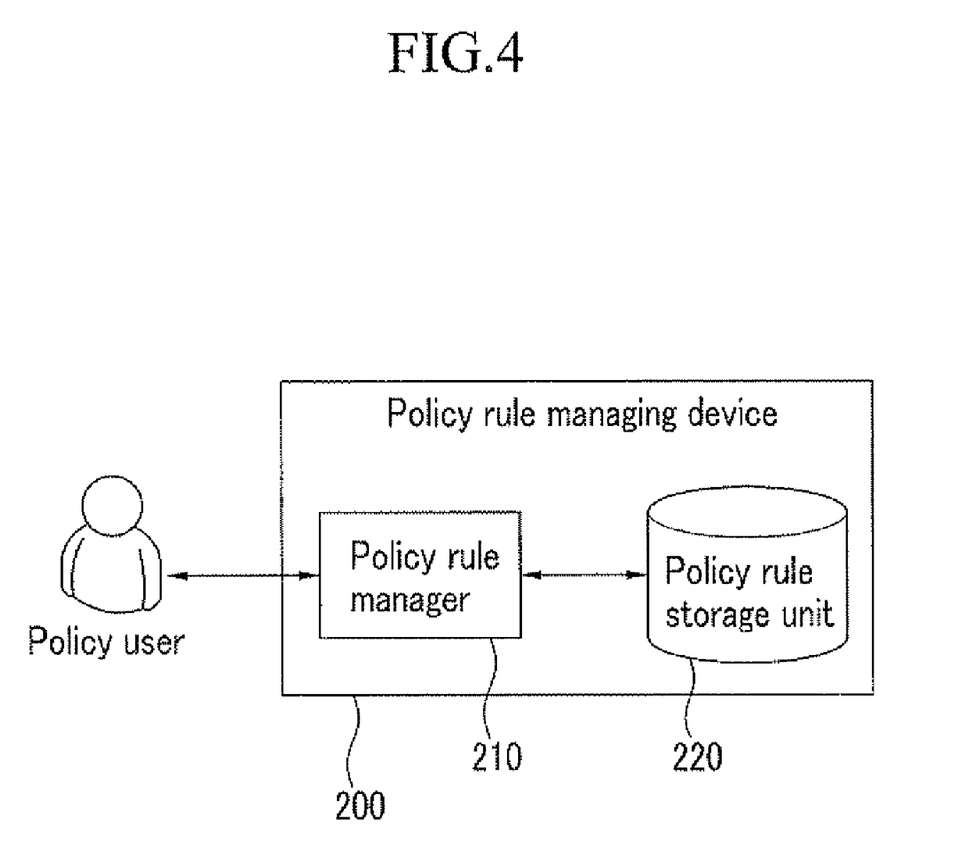
FIG. 4 shows a configuration diagram of a policy rule managing device according to an exemplary embodiment of the present invention.

FIG. 4 shows a configuration diagram of a policy rule managing device 200 according to an exemplary embodiment of the present invention.

Referring to FIG. 4, the policy rule managing device 200 includes a policy rule manager 210 and a policy rule storage unit 220.

The policy rule manager 210 generates the policy rule corresponding to a specific RFID service as a sentence based on the policy user's control input. It stores the policy rule sentence in the policy rule storage unit 220 and manages the same. That is, the policy rule manager 210 can provide the policy rule sentence stored in the policy rule storage unit 220 to the policy user, modifies the same, or deletes it. For this, the policy rule manager 210 includes a GUI or text-based user interface function for the interface with the policy user.

The policy rule sentence stored in the policy rule storage unit 220 can be public to be used by another policy user, and the policy rule manager 210 transmits the policy rule sentence newly generated or stored in the policy rule storage unit 220 to the policy rule performing device 400 based on the policy user's control so that the policy rule sentence may be performed in order to provide the RFID service.

The policy rule manager 210 uses the policy vocabulary stored in the policy vocabulary storage unit 120 so as to generate a policy rule sentence corresponding to the specific RFID service.

Figure 5:
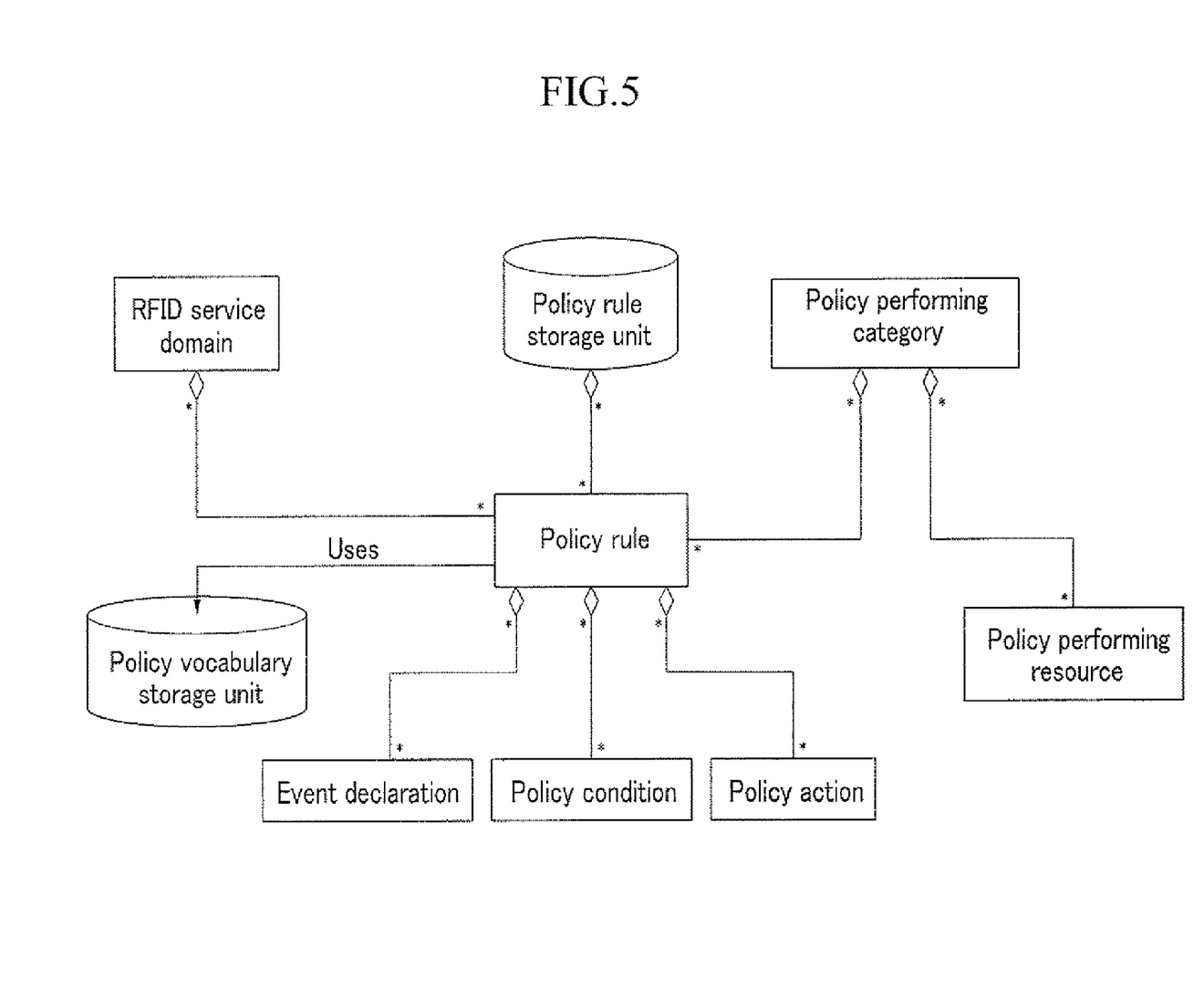
FIG. 5 and FIG. 6 show a configuration of a policy rule according to an exemplary embodiment of the present invention.
Figure 6:
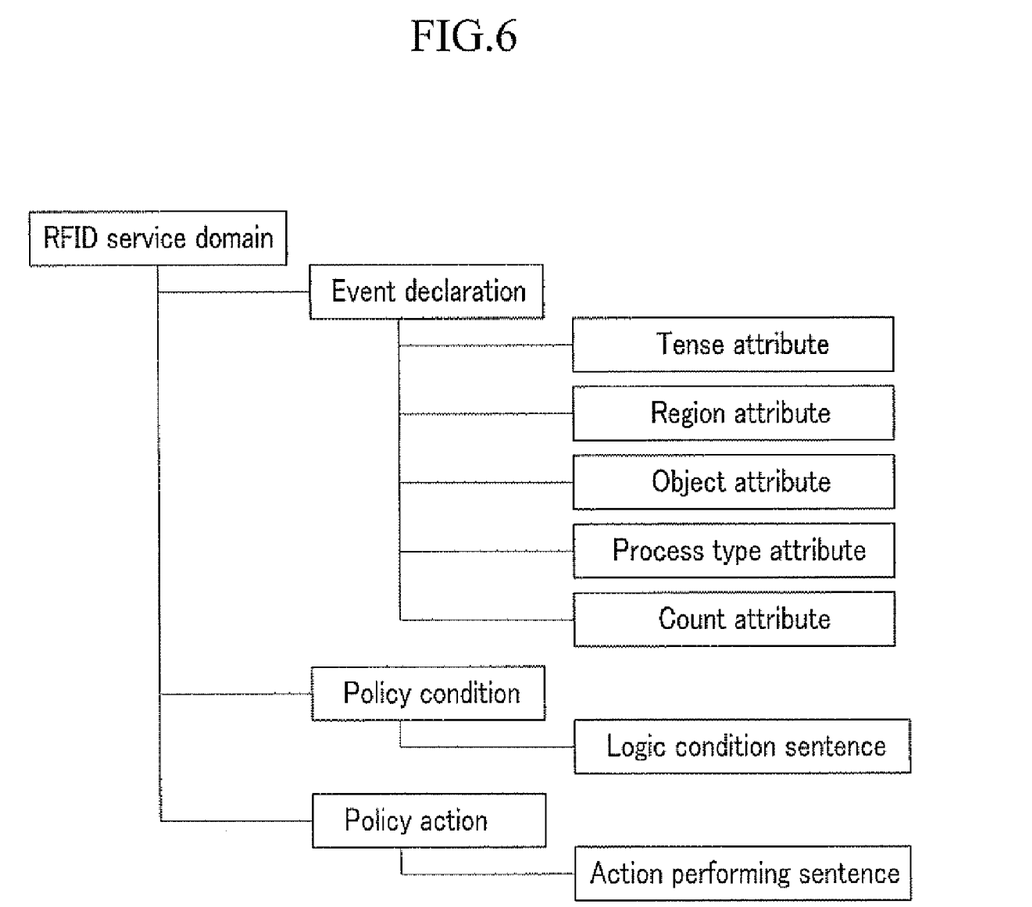

FIG. 5 and FIG. 6 show a configuration of a policy rule according to an exemplary embodiment of the present invention, which is shown by using a UML.

Referring to FIG. 5, a policy rule includes an event declaration, a policy condition, and a policy action.

The event declaration includes condition settings for refining event data collected through the RFID network.

The policy condition includes a sentence corresponding to the logic condition for determining whether the refined event data are suitable for performing a corresponding policy action based on the condition settings that are described in the event declaration.

The policy action includes a unit action or business logic that is performed when the refined event data satisfies the logic condition sentence included in the policy condition.

One policy rule can belong to at least one of an RFID service domain and a policy performing category. Here, the policy performing category represents a logical category including policy performing resources allowable for performing a specific policy rule.

Referring to FIG. 6, the event declaration included in the policy rule includes a tense attribute, a region attribute, an object attribute, a processing type attribute, and a count attribute, and can further include other extendable attributes.

The policy rule managing device 200 sets the valid time for applying the policy rule and the event period for refining the event data transmitted from the RFID network during the corresponding valid time as tense attributes in the event declaration based on the policy user's control input. Here, the policy rule managing device 200 generates a tense attribute value by using the corresponding tense vocabulary when the policy user generates the tense attribute value by using the vocabulary that is directly input according to a predetermined grammatical rule or the policy user selects the tense vocabulary stored in the policy vocabulary storage 120.

The policy rule managing device 200 sets the valid sense region corresponding to the valid region value for sensing the event data generated from the RFID network as the region attribute within the event declaration based on the policy user's control input. Here, the policy rule managing device 200 generates the region attribute value by using the corresponding region vocabulary when the policy user generates the region attribute value by using the directly input vocabulary according to the grammatical rule or the policy user selects the region vocabulary stored in the policy vocabulary storage unit 120.

The policy rule managing device 200 sets the objects including RF tag attached to products, things, equipment, and systems to which the policy rule will be applied as object attribute values within the event declaration based on the policy user's control input. Here, the policy rule managing device 200 generates region attribute values by using corresponding object vocabulary when the policy user generates object attribute values by using the directly input vocabulary according to a predetermined grammatical rule or when the policy user selects object vocabulary stored in the policy vocabulary storage 120.

The policy rule managing device 200 sets a process type for the event data which are determination targets of the logic condition sentence of the policy rule as a process type attribute value within the event declaration based on the policy user's control input. For example, when the process type attribute value is "CURRENTS," the corresponding RFID middleware systems transmit reports for the collected refined event data to the policy rule performing device 400 for each event period corresponding to the tense attribute value within the event declaration. Further, when the process type attribute value is "ADDITIONS," the corresponding RFID middleware systems transmit reports for the refined event data to the policy rule performing device 400 when the refined event data are added to the current event period compared to the previous event period. In addition, when the process type attribute value is "DELETIONS," the corresponding RFID middleware systems transmit reports for the event data that are omitted from the refined result in the previous event period to the policy rule performing device 400.

The policy rule managing device 200 sets a count attribute value within the event declaration when attempting to know information on the number of refined event data which are determination targets of the logic condition sentence of the policy rule based on the policy user's control. The count attribute has "FALSE" as a default, and when the count attribute value is set as "TRUE," it is possible to know the number of the event data by counting the refined event data when performing the policy rule.

The policy condition within the policy rule includes a logic condition sentence, and the policy rule managing device 200 refers to the event declaration within the policy rule to generate a logic condition sentence for determining whether the refined event data satisfies the policy action performance condition. Here, the logic condition sentence includes a plurality of clauses that are generated by connecting at least one clause by using logical operators AND, OR, and XOR. The policy rule managing device 200 generates a logic condition sentence by using the vocabulary directly input by the policy user according to a predetermined grammatical rule or generates a logic condition sentence by using the policy vocabulary selected by the policy user from among the policy vocabulary stored in the policy vocabulary storage 120.

The policy action within the policy rule includes an action performance sentence, and the policy rule managing device 200 generates an action performance sentence that is driven when the refined event data satisfy the logic condition sentence based on the policy user's control input. Here, the action performance sentence includes an application system and parameter information for performing a unit action or business logic. The policy rule managing device 200 generates an action performance sentence by using vocabulary directly input by the policy user according to a predetermined grammatical rule, or it generates an action performance sentence by using corresponding predicative vocabulary when the policy user selects predicative vocabulary stored in the policy vocabulary storage 120.

Sentence 1 represents an example of the policy rule sentence, showing a security management policy for a new medicine developed by a specific pharmaceutical company.

---
Sentence 1
POLICY(ROLE: medical lab security, NAME: medicine security management policy)
    EVENT_DECLARATION
        WHEN: security management time
        WHERE: medicine lab 1 AND medicine lab 2
        WHAT: new anti-cancer medicine
        HOW: DELETIONS
        COUNT_MODE: TRUE
    CONDITION
        COUNT(WHAT new anti-cancer medicine)! = 100
    DECISION
        ALERT

---

In Sentence 1, POLICY represents a policy rule corresponding to the security management policy for the new medicine. ROLE defined to POLICY indicates a policy performing category to which the corresponding policy rule belongs, and NAME shows an identity assigned to the corresponding policy rule. EVENT_DECLARATION corresponds to the event declaration, and WHEN, WHERE, WHAT, HOW, and COUNT_MODE included in EVENT_DECLARATION represent tense attribute, region attribute, object attribute, process type attribute, and count attribute within the event declaration.

In Sentence 1, the tense attribute value WHEN is set by using tense vocabulary stored with the identity called the "security management time" from among the tense vocabulary stored in the policy vocabulary storage 120, and the region attributes WHERE is set by using the region vocabulary stored with the identity called the first medicine lab and the second medicine lab from among the region vocabulary stored in the policy vocabulary storage 120. Also, the object attribute value WHAT is set by using the object vocabulary stored with the identity of "new anti-cancer medicine" from among the object vocabulary stored in the policy vocabulary storage 120.

The attribute HOW stored in EVENT_DECLARATION corresponds to the process type attribute, and it sets whether to report the event data refined during the event period within the valid time to which the policy rule is applied either for each event period or each time when a modification is generated to the policy rule performing system. The attribute HOW sets whether to report the result data that are refined during the event cycle operable within the valid time to the policy performing system for each period or when a modified item is generated. Also, COUNT_MODE corresponds to the count attribute, and it is set to be "TRUE" in Sentence 1.

CONDITION corresponds to the policy condition, and it includes a logic condition sentence for determining conformity of the refined event data based on the values of the attributes included in EVENT_DECLARATION. Further, DECISION corresponds to the policy action, and it includes an action performing sentence having described a unit action or business logic to be performed when the corresponding refined event data satisfy the logic condition sentence (TRUE) included in the policy condition CONDITION when receiving the report for the refined event data from the RFID middleware systems included in the policy performing category.

Figure 7:
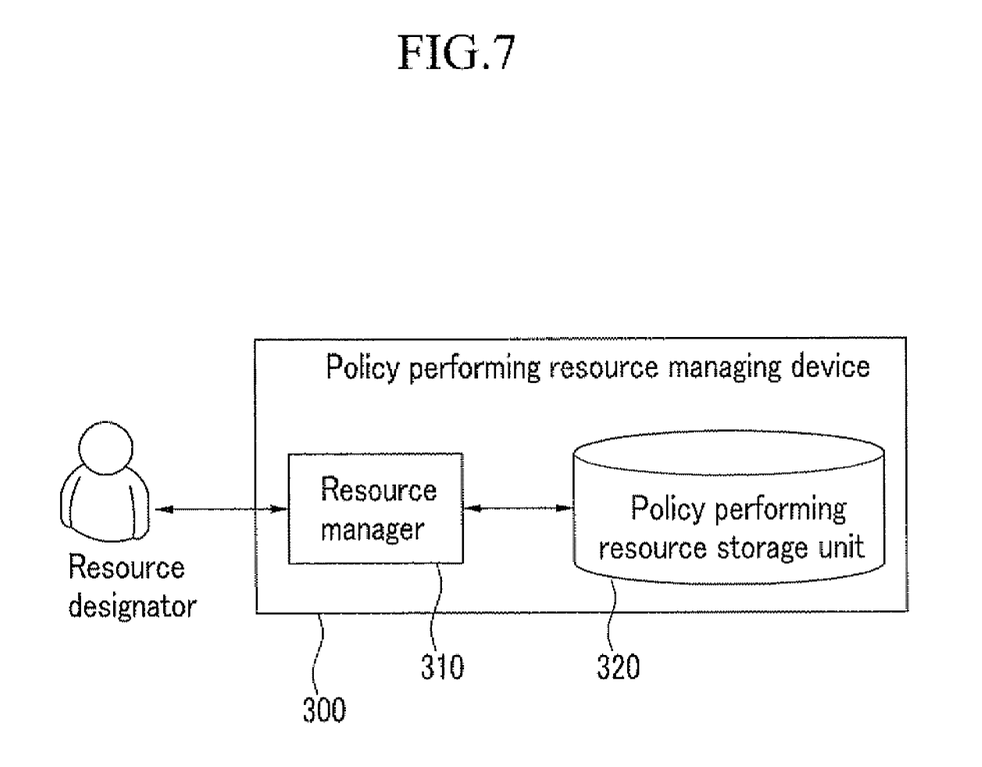
FIG. 7 shows a configuration diagram of a policy performing resource managing device according to an exemplary embodiment of the present invention.

FIG. 7 shows a configuration diagram of a policy performing resource managing device 300 according to an exemplary embodiment of the present invention.

Referring to FIG. 7, the policy performing resource managing device 300 includes a resource manager 310 and a policy performing resource storage unit 320.

The resource manager 310 generates resource information for the policy rule performing device 400 to perform the policy rule corresponding to the RFID service. The resource manager 310 stores the resource information in the policy performing resource storage 320 and manages it. That is, the resource manager 310 provides the resource information stored in the policy performing resource storage 320 to the resource designator, modifies it, or deletes it. For this, the resource manager 310 includes a GUI or text-based user interface function for an interface with the resource designator.

Figure 8:
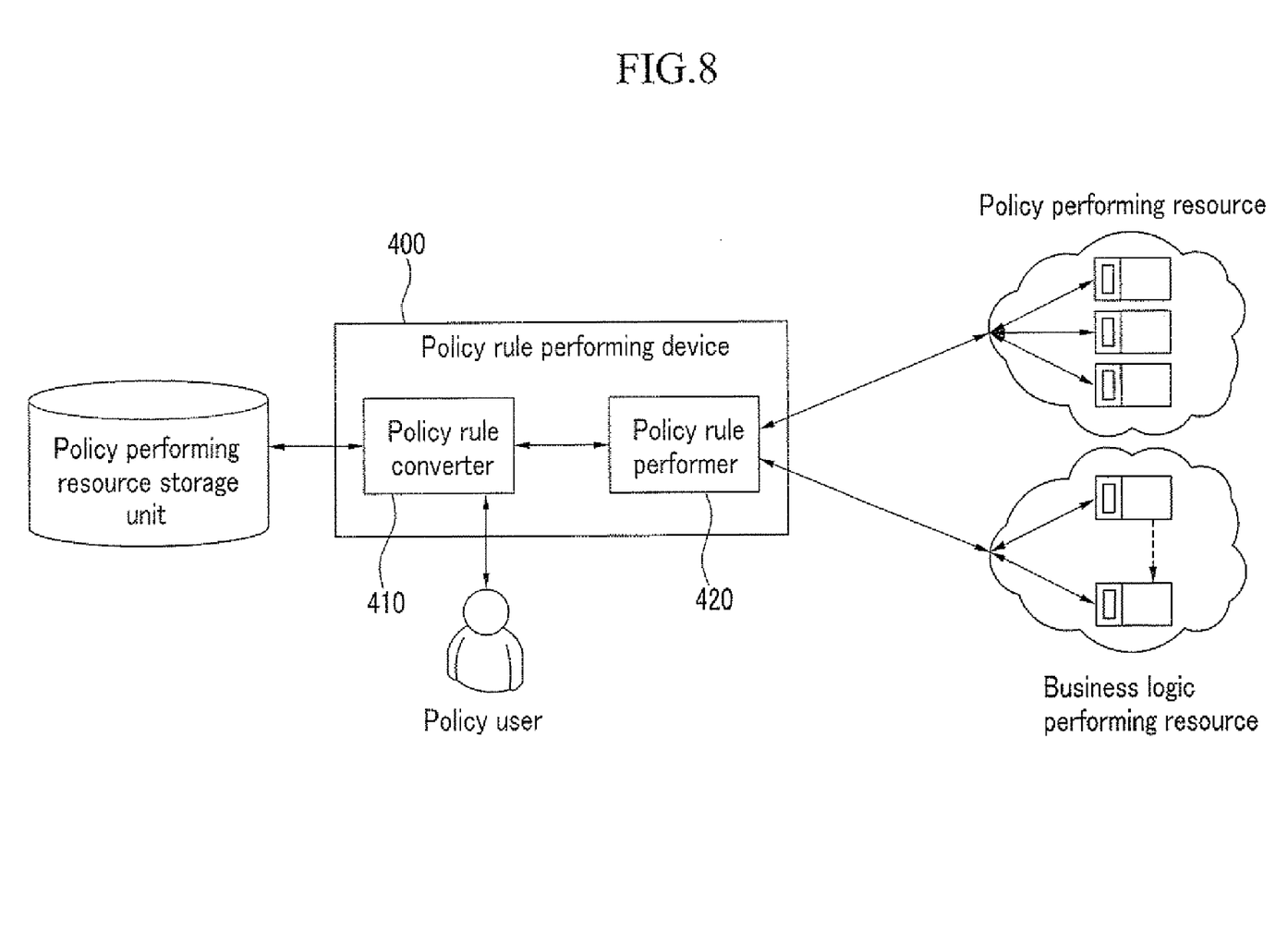
FIG. 8 shows a configuration diagram of a policy rule performing device according to an exemplary embodiment of the present invention.

FIG. 8 shows a configuration diagram of a policy rule performing device 400 according to an exemplary embodiment of the present invention.

Referring to FIG. 8, the policy rule performing device 400 includes a policy rule converter 410 and a policy rule performer 420.

The policy rule converter 410 converts the user-level policy rule sentence input by the policy rule managing device 200 into policy rule data that are executable by the policy rule performer 420 based on the policy user's control. The policy rule converter 410 collects profiles of the resources included in the policy performing category to which the corresponding policy rule belongs based on the corresponding resource information stored in the policy performing resource storage 320. The policy rule converter 410 converts the event declaration included in the policy rule sentence into an event standard specification to be processed by the RFID middleware systems based on the collected resource profile information.

Also, the policy rule converter 410 outputs the converted policy rule sentence as the policy rule data and event standard specification to the policy rule performer 420.

The policy rule performer 420 sets a communication connecting channel with the RFID middleware systems for refining the event data received from the RFID network based on the event standard specification transmitted by the policy rule converter 410. The policy rule performer 420 distributes the event standard specification to the RFID middleware systems through the established connecting channel. Also, the policy rule performer 420 extracts the refined event data from a report for the refined event data based on the policy rule data when receiving the report from the RFID middleware systems to which the connecting channel is established. The policy rule performer 420 checks whether the extracted refined event data satisfy the policy rule's logic condition sentence. When the refined event data satisfy the logic condition sentence, the policy rule performer 420 calls and drives an application system for performing a unit action or business logic corresponding to the policy action's action performing sentence.

Figure 9:
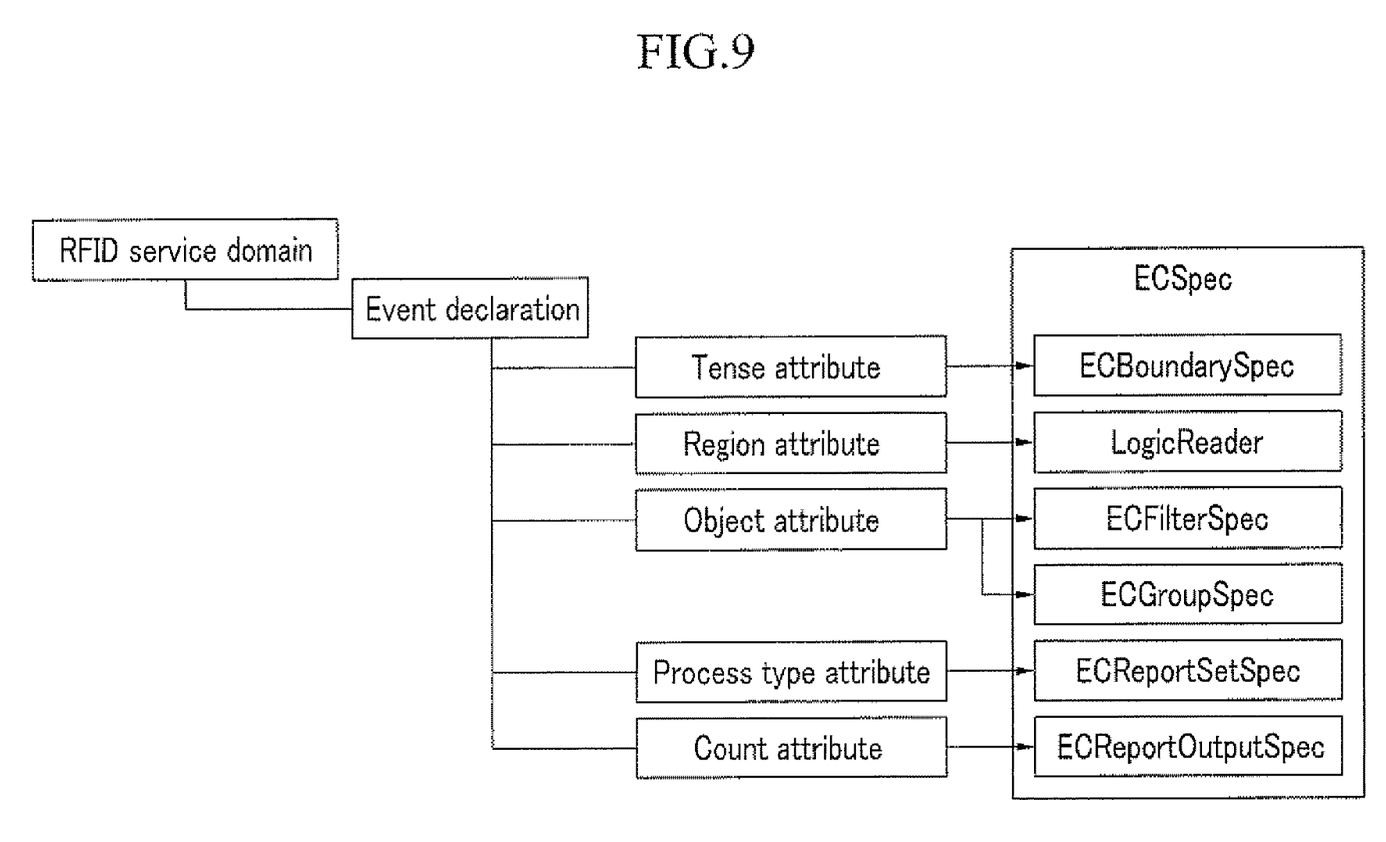
FIG. 9 shows a conversion of an event declaration into an event standard specification according to an exemplary embodiment of the present invention.

FIG. 9 shows a conversion of an event declaration into an event standard specification according to an exemplary embodiment of the present invention, showing an event standard specification (ECSpec) generated based on the application level event (ALE) standard.

Referring to FIG. 9, the tense attribute within the event declaration included in the policy rule sentence is converted into ECBoundarySpec which is a lower component of ECSpec, and the region attribute is converted into Logical- Reader which is a lower component of ECSpec. Also, the object attribute is converted into ECFilterSpec and ECGroupSpec which are lower components of ECSpec, the process type attribute is converted into ECReportSetSpec which is a component of ECSpec, and the count attribute is converted into ECReportOutputSpec which is a lower component of ECSpec.

Figure 10:
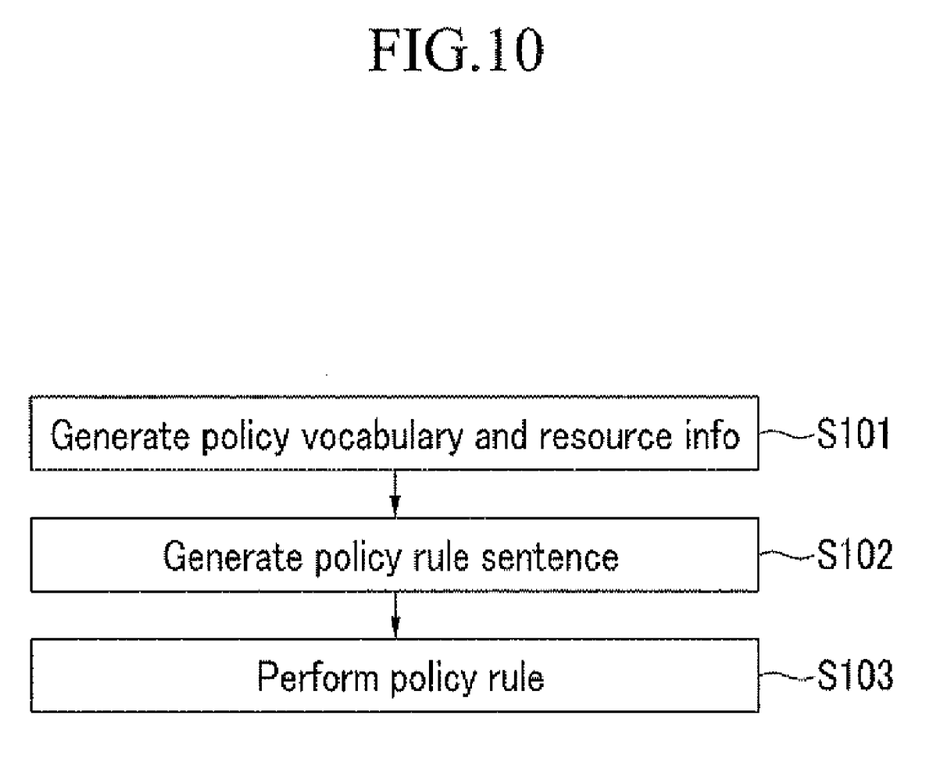
FIG. 10 shows a flowchart of a method for an RFID service providing system to provide a policy based RFID service according to an exemplary embodiment of the present invention.

FIG. 10 shows a flowchart of a method for an RFID service providing system to provide a policy based REID service according to an exemplary embodiment of the present invention.

Referring to FIG. 10, the policy vocabulary managing device 100 generates policy vocabulary for writing a policy rule sentence corresponding to the RFID service based on the policy vocabulary writer's control input. The policy performing resource managing device 300 generates resource information including resources for performing the RFID service's policy rule based on the policy performing resource designator's control input (S101).

The policy rule managing device 200 generates a sentence for the policy rule of the corresponding RFID service by using the generated policy vocabulary based on the policy user's control input (S102). The policy rule managing device 200 transmits the generated policy rule sentence to the policy rule performing device 400 to be disposed thereon.

The policy rule performing device 400 performs the policy rule based on the received policy rule sentence (S103). That is, the policy rule performing device 400 receives the refined event data from the RFID middleware systems based on the policy rule, and drives an application system corresponding to the refined event data.

Figure 11:
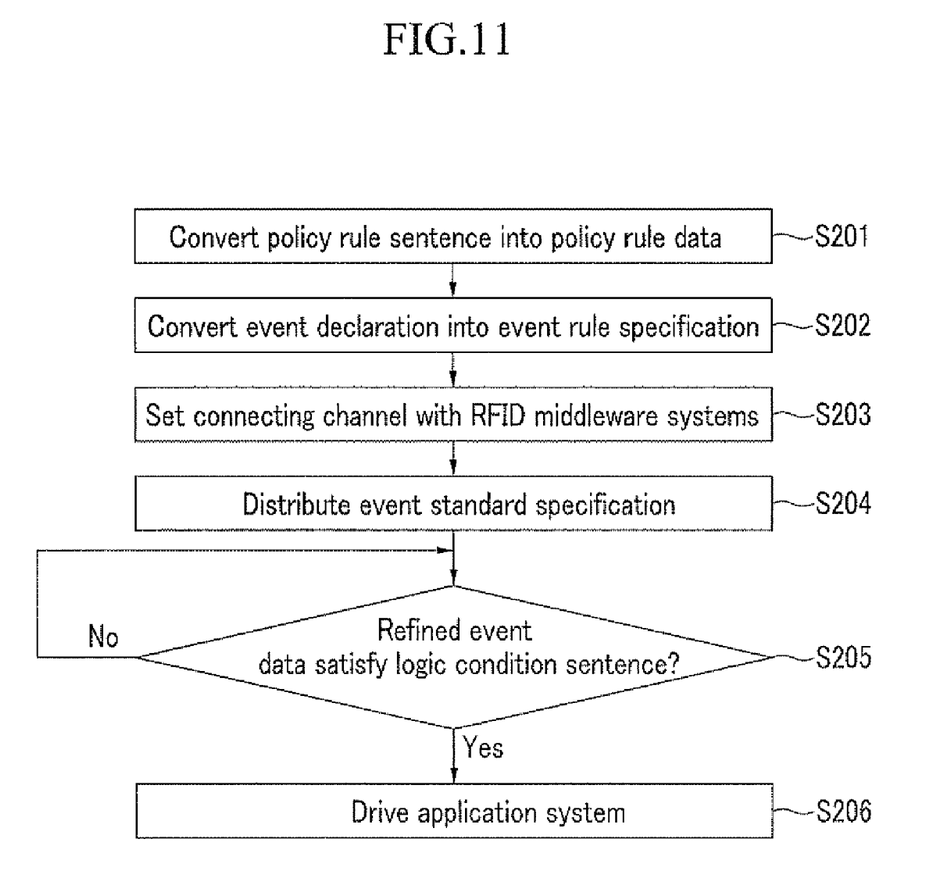
FIG. 11 shows a flowchart of a method for performing a policy rule so as to provide a policy based RFID service according to an exemplary embodiment of the present invention.

FIG. 11 shows a flowchart of a method for performing a policy rule so as to provide a policy based RFID service according to an exemplary embodiment of the present invention.

Referring to FIG. 11, the policy rule performing device 400 converts the user-level policy rule sentence input through the policy rule converter 410 into policy rule data executable by the policy rule performer 420 (S201).

The policy rule performing device 400 collects profiles of the resource included in the policy performing category to which the policy rule belongs through the policy rule converter 410 based on the corresponding resource information stored in the policy performing resource storage 320. The policy rule performing device 400 converts the event declaration included in the policy rule sentence into an event standard specification (S202) executable by the RFID middleware systems based on the collected resource profile information.

The policy rule performer 420 sets a communication connecting channel with the RFID middleware systems based on the event standard specification (S203), and distributes the converted event standard specification to the connecting channel established RFID middleware systems (S204).

When having received the event standard specification, the RFID middleware systems refine the event data generated by the RFID network, and transmit a report for the refined event data to the policy rule performer 420.

When having received the report, the policy rule performer 420 determines whether the received refined event data satisfy the logic condition sentence of the policy condition included in the policy rule sentence based on the policy rule data (S205). When the refined event data satisfy the logic condition sentence, the policy rule performer 420 calls and drives the application system corresponding to the action performing sentence of the policy action included in the policy rule sentence (S206).

It is possible in the above-described exemplary embodiment of the present invention to combine actions to be performed into a policy when the condition that can occur under the RFID network environment and the event data that are generated by the RFID network satisfy the corresponding condition. Also, the requirements by the RFID service users are quickly applied to the corresponding RFID service to allow fast and flexible correspondence.

Further, the RFID service developer corresponding to the policy performing user uses the policy vocabulary generated in advance to write a policy rule sentence for the desired RFID service and control it to be performed in real-time through the policy rule performing device so that the event data processed in the RFID network domain may cooperate flexibly and in real-time with the application systems in the business domain and the existing load of the RFID service developers may be minimized.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for providing a policy based radio frequency identification service, comprising:

a policy rule converter for converting a user level policy rule sentence generated by using generated policy vocabulary into an executable format, and converting an event declaration within the policy rule sentence into a format that is executable by a middleware system based on generated policy performing resource information; and a policy rule performer for distributing the converted event declaration to the middleware system, determining whether refined event data that are refined and transmitted by the middleware system based on the converted event declaration satisfy a policy condition of the policy rule sentence, and determining whether to drive an application system for performing a policy action of the policy rule sentence.

2. The system of claim 1, wherein
the converter collects a profile of a resource included in a policy performing category to which a policy rule corresponding to the policy rule belongs based on the resource information, and converts the event declaration based on the collected profile.

3. The system of claim 2, wherein
the policy vocabulary belongs to at least one radio frequency identification service domain, and it is classified as one of tense vocabulary, region vocabulary, object vocabulary, and predicative vocabulary.

4. The system of claim 3, wherein
the event declaration includes a tense attribute generated by using the tense vocabulary, a region attribute generated by using the region vocabulary, an object attribute generated by using the object vocabulary, a process type attribute having a process type for the refined event data as an attribute, and a count attribute having a checked state on the number information of the refined event data as an attribute.

5. A system for providing a policy based radio frequency identification service comprising:
 a policy vocabulary managing device for generating and managing policy vocabulary for generating a policy rule corresponding to the radio frequency identification service;
 a policy performing resource managing device for generating and managing resource information for performing the policy rule;
 a policy rule managing device for generating and managing a policy rule sentence corresponding to the policy rule by using the policy vocabulary; and
 a policy rule performing device for distributing an event declaration included in the policy rule to a middleware system, determining whether the refined event data that is refined and transmitted by the middleware system based on the event declaration satisfy a policy condition included in the policy rule, and determining whether to drive an application system.

6. The system of claim 5, wherein the policy vocabulary managing device includes:
 a policy vocabulary storage unit for storing the policy vocabulary; and
 a policy vocabulary manager for generating the policy vocabulary, storing the generated policy vocabulary in the policy vocabulary storage unit, and managing the same based on a policy vocabulary writer's control input.

7. The system of claim 5, wherein the policy rule managing device includes:
 a policy rule storage unit for storing the policy rule sentence; and
 a policy rule manager for generating the policy rule sentence configured with the event declaration, the policy condition, and the policy action by using the policy vocabulary based on the policy user's control input, storing the policy rule sentence in the policy rule storage unit, and managing the same.

8. The system of claim 7, wherein
 the policy rule manager transmits the policy rule sentence to the policy rule performing device based on the policy user's control input.

9. The system of claim 8, wherein
 the event declaration includes a condition setting for refining the event data collected through a radio frequency identification network,
 the policy condition includes a logic condition sentence, and
 the policy action includes an action performing sentence corresponding to an action that is performed when the refined event data satisfy the logic condition sentence.

10. The system of claim 9, wherein the policy rule performing device includes:
 a policy rule converter for converting a user level the policy rule sentence into executable policy rule data, collecting profiles of resources included in a policy performing category to which the policy rule belongs based on the resource information, and converting the event declaration into the event standard specification that is executable by the middleware system based on the profile; and
 a policy rule performer for distributing the event standard specification to the middleware system through an established communication connecting channel, and calling and driving the application system for performing a unit action or business logic included in the action performing sentence when the refined event data received from the middleware system satisfy the logic condition sentence based on the policy rule data.

11. The system of claim 5, wherein the policy performing resource managing device includes:
 a policy performing resource storage unit for storing the resource information; and
 a resource manager for generating the resource information based on a resource designator's control input, storing the generated resource information in the policy performing resource storage unit, and managing the same.

12. A method for providing a policy based radio frequency identification service, comprising:
 converting a user level policy rule sentence generated by using generated policy vocabulary into an executable format;
 converting an event declaration within the policy rule sentence into a format executable by a middleware system;
 distributing the converted event declaration to the middleware system;
 determining whether the refined event data that are refined and transmitted by the middleware system based on the event declaration satisfy a policy condition corresponding to the policy rule sentence; and
 calling and driving an application system for performing a policy action when the refined event data satisfy the policy condition.

13. The method of claim 12, wherein the converting an event declaration includes:
 collecting a profile of the resource included in a policy performing category to which a policy rule corresponding to the policy rule sentence belongs based on generated resource information; and
 converting the event declaration based on the collected profile.

14. The method of claim 12, wherein the distributing includes:
 setting a communication connecting channel with the middleware system; and
 transmitting the converted event declaration to the middleware system through the communication connecting channel.

15. The method of claim 12, wherein the determining includes
 checking whether the refined event data satisfy a logic condition sentence corresponding to the policy condition.

16. The method of claim 15, wherein the driving includes
 calling and driving the application system for performing a unit action or business logic corresponding to the policy action within the policy rule sentence when the refined event data satisfy the logic condition sentence.

17. A method for providing a policy based radio frequency identification service, comprising:
 generating policy vocabulary for writing a policy rule corresponding to the radio frequency identification service as a policy rule sentence;
 generating resource information for performing the policy rule;
 generating the policy rule sentence by using the policy vocabulary;
 converting an event declaration included in the policy rule sentence into a format executable by a middleware system, and distributing the format to the middleware system; and driving an application system for performing a unit action or business logic corresponding to policy performance of the policy rule sentence when refined event data that are refined and transmitted by the middleware system based on the event declaration satisfy a policy condition of the policy rule sentence.

18. The method of claim 17, wherein the generating the policy rule sentence includes:

including event declaration including a tense attribute, a region attribute, an object attribute, a process type attribute, and a count attribute into the policy rule sentence;

including the policy condition including a logic condition sentence for determining the refined data into the policy rule sentence; and including the policy action including an action performing sentence corresponding to the unit action or the business logic driven when the refined data satisfy the logic condition sentence, into the policy rule sentence.

19. The method of claim 18, wherein the driving includes:

receiving the refined event data from the middleware system;

determining whether the refined event data satisfy the logic condition sentence; and calling the application system when the refined event data satisfy the logic condition sentence.

* * * * *